(12) United States Patent
Shin et al.

(10) Patent No.: US 9,387,585 B2
(45) Date of Patent: Jul. 12, 2016

(54) TWO-FAR END SUPPORTED ACTUATOR MODULE FOR SNAKE ROBOT USING INNER WIRE

(71) Applicant: KOREA ATOMIC ENERGY RESEARCH INSTITUTE, Daejeon (KR)

(72) Inventors: Hocheol Shin, Daejeon (KR); Chang Hoi Kim, Daejeon (KR); Heung Seop Eom, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 241 days.

(21) Appl. No.: 14/135,514

(22) Filed: Dec. 19, 2013

(65) Prior Publication Data

US 2014/0202275 A1 Jul. 24, 2014

(30) Foreign Application Priority Data

Jan. 24, 2013 (KR) .................. 10-2013-0007871

(51) Int. Cl.
*B25J 9/06* (2006.01)
*B25J 19/00* (2006.01)

(52) U.S. Cl.
CPC .............. *B25J 9/065* (2013.01); *B25J 19/0029* (2013.01); *Y10T 74/20317* (2015.01)

(58) Field of Classification Search
CPC ............ B25J 9/06; B25J 9/065; B25J 9/0078; B25J 9/126; B25J 11/003
USPC ............... 74/490.01, 490.02, 490.04, 490.05; 600/114, 139–145; 901/23, 38, 42
See application file for complete search history.

(56) References Cited

U.S. PATENT DOCUMENTS

| 7,597,025 | B2 * | 10/2009 | Narita | B25J 9/06 74/490.02 |
| 7,752,939 | B2 * | 7/2010 | Ono | B25J 9/042 74/490.03 |
| 8,286,527 | B2 * | 10/2012 | Liu | B25J 19/0079 74/490.02 |
| 2005/0166699 | A1 * | 8/2005 | Meyerhoff | B25J 9/044 74/490.01 |
| 2011/0010011 | A1 * | 1/2011 | Oka | B25J 9/1633 700/258 |
| 2012/0176007 | A1 * | 7/2012 | Takeuchi | H02K 7/116 310/68 B |
| 2012/0198955 | A1 * | 8/2012 | Hayashi | B25J 9/0009 74/490.05 |

FOREIGN PATENT DOCUMENTS

KR 10-0929160 9/2009

* cited by examiner

*Primary Examiner* — David M Fenstermacher
(74) *Attorney, Agent, or Firm* — Morrison & Foerster LLP

(57) ABSTRACT

A two-far end supported actuator module for a snake robot using an inner wire includes: a module housing having a driving means and a reducer mounted therein, and having a plurality of accommodation portions on an outer surface thereof; an upper cover and a lower cover detachably installed at an upper part and a lower part of the module housing, respectively, wherein the upper cover has a rotation shaft passing hole for passing a rotation shaft therethrough, and the lower cover has a wire passing hole for passing a wire therethrough; a first connection bracket having one side coupled to one accommodation portion of the module housing, and another side coupled to a lower cover of another driving module, and configured to guide the wire thereinto; and a second connection bracket coupled to another accommodation portion of the module housing on the opposite side of the first connection bracket, and another side to which a rotation shaft is inserted to be supported.

6 Claims, 5 Drawing Sheets

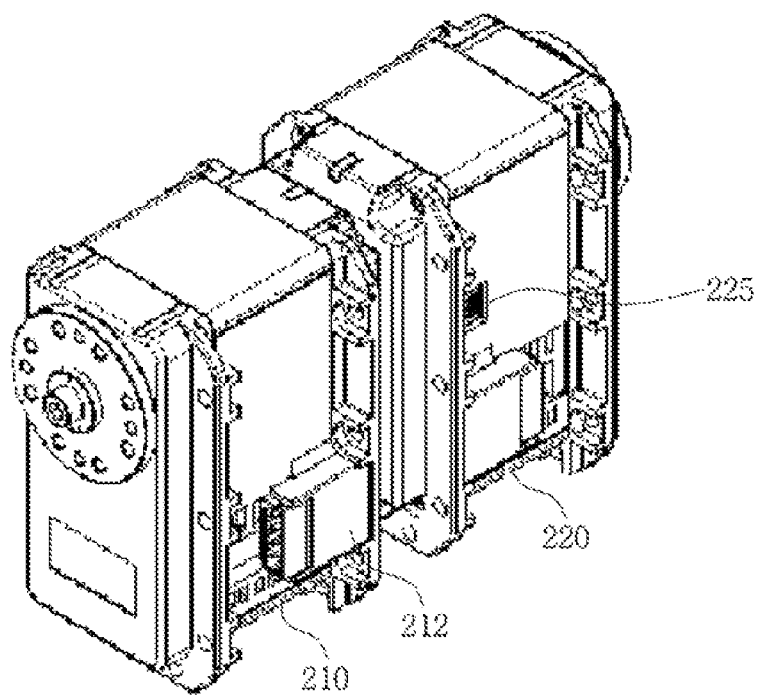
FIGURE 7 -- Prior Art --

TWO-FAR END SUPPORTED ACTUATOR MODULE FOR SNAKE ROBOT USING INNER WIRE

CROSS-REFERENCE TO RELATED APPLICATION

Pursuant to 35 U.S.C. §119(a), this application claims the benefit of earlier filing date and right of priority to Korean Application No. 10-2013-0007871, filed on Jan. 24, 2013, the contents of which is incorporated by reference herein in its entirety.

BACKGROUND OF THE DISCLOSURE

1. Field of the Disclosure

The present disclosure relates to a two-far end supported actuator module for a snake robot using an inner wire, and more particularly, to a two-far end supported actuator module for a snake robot using an inner wire, capable of using a connection brack
et which constitutes a body of a snake robot without additionally installing the conventional connection member which protrudes from an outer surface of the actuator module.

2. Background of the Disclosure

Unlike industrial robots, robots which provide various services at homes, medical institutions, etc. are called personal robots. As a type of the personal robots, there are educational robots or entertainment robots mainly operating for education or play, and having psychological healing effects. Such educational robots or entertainment robots are manufactured to have a similar shape to a man or an animal, so as to provide a user with familiarity. And the educational robots or entertainment robots are configured so as to move freely.

Such educational robots or entertainment robots mainly use a servo actuator module having a controller therein. For instance, the education robots or entertainment robots are configured as two-leg robots for walking or operating like a man, four-leg robots for walking like a dog, a cat, etc., six-leg robots for describing an insect's behaviors, etc., using a servo actuator module. Such two-leg robots, four-leg robots, or six-leg robots should move with various degrees of freedom so as to describe various movements.

More specifically, when designing robots with many modules having one degree of freedom, overweight is loaded on the lower parts. Using big actuator modules to solve this problem, may cause the robots to have an increased volume and load. Accordingly, there are many restrictions in designing multi-joint robots.

A technique to solve such problems has been disclosed in the following cited reference 1. The following cited reference 1 discloses a structure to reduce an excessive load applied to a lower part of a multi-joint robot. The following cited reference 1 relates to a small actuator module set for a small and light multi-joint robot, and a multi-joint robot fabricated using the small actuator module set.

As shown in FIG. 7, in the conventional small actuator module, a master actuator module 210 on the left, and a slave actuator module 220 on the right are arranged so as to face each other. A dual mode connector 225 provided to one side of the slave actuator module 220, and a dual mode connector 225 provided to the master actuator module 210 are connected to each other by a wire. As a result, the master actuator module 210 and the slave actuator module 220 are electrically-connected to each other to implement a single actuator module set.

In the small actuator module set, two actuator module sets are coupled to each other using a connection member (not shown). The small actuator module 210 may further comprise a communication connection portion 212 for wireless communication between a central processing means and a central controller of a multi-joint robot.

However, in the conventional art, two actuator module sets should be coupled to each other using an additional connection member which protrudes to outside. This may cause a difficulty in fabricating a small and light multi-joint robot. Further, as the protruded connection member may interfere with external environments, the robot may have restricted movements, and the entire weight and volume of the robot may be increased.

Besides, as the wire for connecting the two connectors 225 is exposed to outside of an outer circumferential surface of the actuator, movements of the joint may be restricted, and the wire may be twisted. The wire exposed to outside may be damaged due to friction with external environments. Further, the wire exposed to outside may cause the robot to have a degraded appearance.

REFERENCES CITED

Patent Document (Patent Document 1) Korean Patent Registration Publication No. 10-0929160 (Registered on Nov. 23, 2009)

SUMMARY OF THE DISCLOSURE

Therefore, an aspect of the detailed description is to provide a two-far end supported actuator module for a snake robot using an inner wire, capable of minimizing interference between a snake robot and external environments by using a connection bracket which constitutes a body of a snake robot without using the conventional connection member which protrudes from an outer surface of the actuator module, and capable of preventing increase of an entire weight and volume thereof.

Another aspect of the detailed description is to provide a two-far end supported actuator module for a snake robot using an inner wire, capable of solving the conventional problems, such as disconnection or twist of a wire occurring when the driving module operates, by installing a wire to pass through inside of the driving module, without exposing the wire to outside of the driving module.

To achieve these and other advantages and in accordance with the purpose of this specification, as embodied and broadly described herein, there is provided a two-far end supported actuator module for a snake robot using an inner wire, comprising: a module housing having a driving means and a reducer mounted therein, and having a plurality of accommodation portions on an outer surface thereof; an upper cover and a lower cover detachably installed at an upper part and a lower part of the module housing, respectively, wherein the upper cover has a rotation shaft passing hole for passing a rotation shaft therethrough, and the lower cover has a wire passing hole for passing a wire therethrough; a first connection bracket having one side coupled to one accommodation portion of the module housing, and another side coupled to a lower cover of another driving module, having a size not greater than that of a driving module, and configured to guide the wire thereinto; and a second connection bracket having one side coupled to another accommodation portion of the module housing on the opposite side of the first connection bracket, and another side to which a rotation shaft is inserted to be supported, having a size not greater than that of the driving module.

The cover may include a protrusion portion having a semicircular shape in a planar view; a rotation portion outward extending from the protrusion portion with an inclination angle, and guiding the driving module to rotate with an angle of 90° right and left; and a rolling portion having a curved shape in a side view, extending from the end of the rotation portion, and guiding the driving module to roll freely.

A bearing may be forcibly-inserted into the wire passing hole of the lower cover.

A groove may be formed at an intermediate part of each surface of the upper cover, the lower cover, the first connection bracket and the second connection bracket, in a lengthwise direction.

A rubber pad may be attached to at least one of surfaces of the module housing, the upper cover and the lower cover, for prevention of damage of the surface due to friction with the floor, and for attenuation of an impact.

The first connection bracket may include: a first fixing portion inserted into the accommodation portion of the module housing, formed to have the same thickness as a depth of the accommodation portion, and having a plurality of coupling holes for coupling bolts; a first connection portion extending from the first fixing portion, and having an inner side surface from which an insertion portion protrudes, the insertion portion to be inserted into the wire passing hole of the lower cover of said another driving module; and a wire inducing accommodation portion formed on an inner side surface of the first fixing portion and the first connection portion in a lengthwise direction, and inducing the wire to pass through inside of the first connection bracket without being exposed to outside.

The second connection bracket may include: a second fixing portion inserted into the accommodation portion of the module housing, formed to have the same thickness as a depth of the accommodation portion, and having a plurality of coupling holes for coupling bolts; and a second connection portion extending from the second fixing portion, and having a through hole for inserting the rotation shaft of said another driving module thereinto.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 7 is a view illustrating a small actuator module in accordance with the conventional art.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a two-far end supported actuator module for a snake robot using an inner wire according to the present invention will be explained in more detail with reference to the attached drawings.

A singular expression used in this specification includes a plural meaning unless it is disclosed definitely. If it is regarded that detailed descriptions of the related art are not within the range of the present invention, the detailed descriptions will be omitted. Furthermore, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Figure 1:
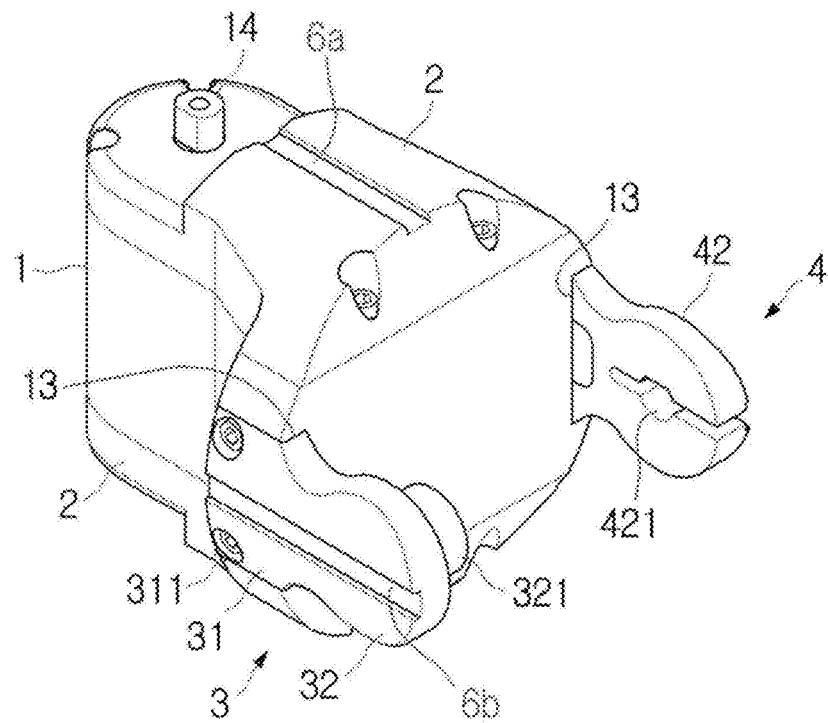
FIG. 1 is a perspective view of a two-far end supported actuator module for a snake robot using an inner wire according to the present invention.
Figure 2:
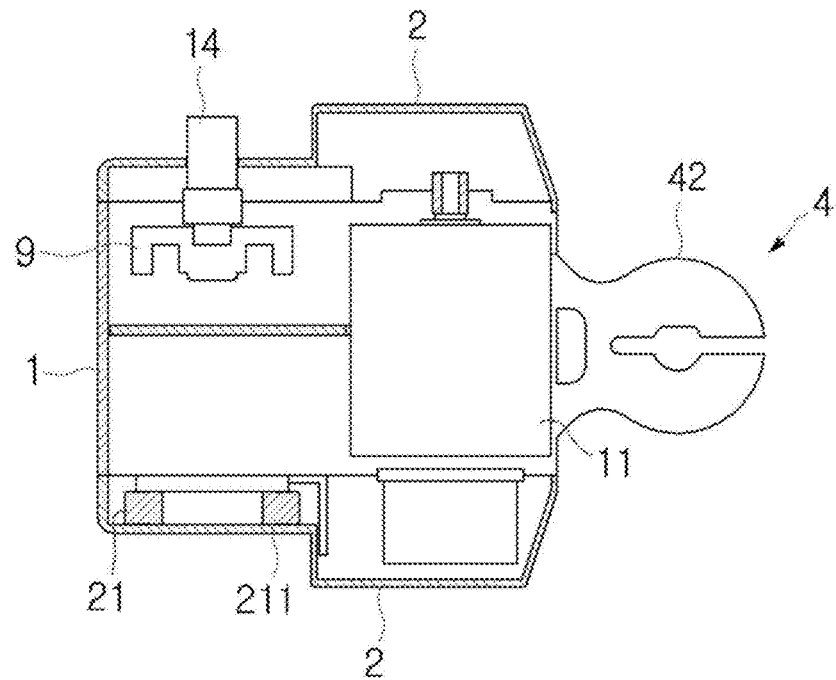
FIG. 2 is a frontal sectional view of a two-far end supported actuator module for a snake robot using an inner wire according to the present invention.
Figure 3:
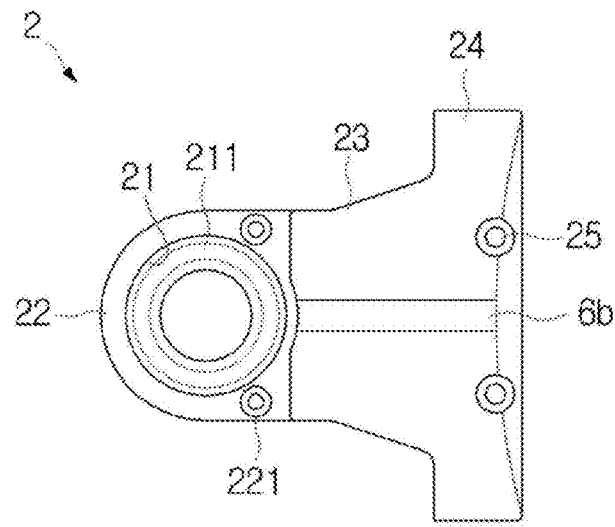
FIG. 3 is a bottom view illustrating a lower cover of a two-far end supported actuator module for a snake robot using an inner wire according to the present invention.
Figure 4:
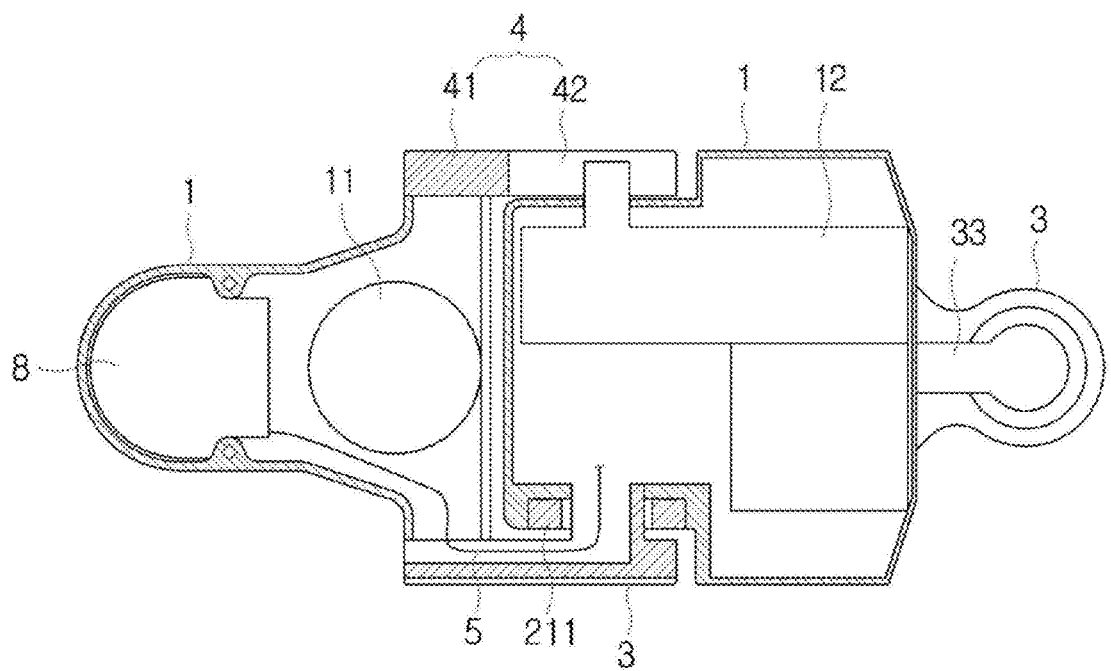
FIG. 4 is a planar sectional view illustrating a coupled state among a plurality of two-far end supported actuator modules for a snake robot using an inner wire according to the present invention.
Figure 5:
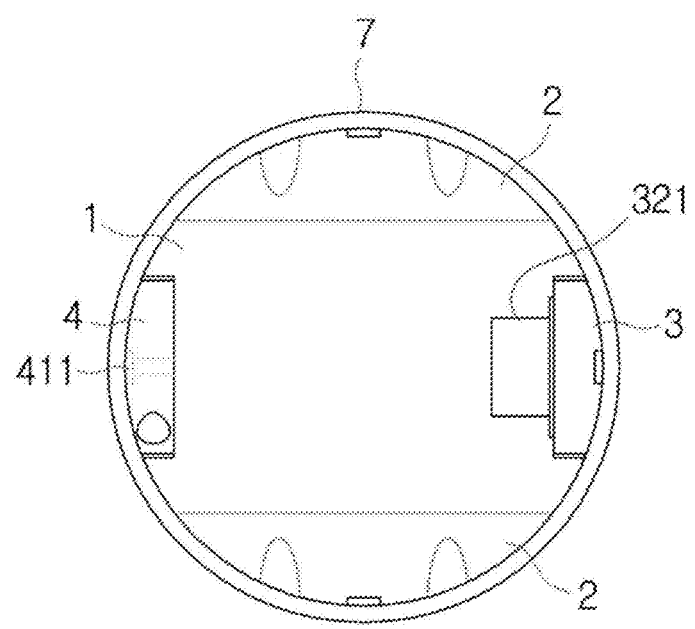
FIG. 5 is a side sectional view illustrating an example of an attached state of a rubber pad of two-far end supported actuator modules for a snake robot using an inner wire according to the present invention.
Figure 6:
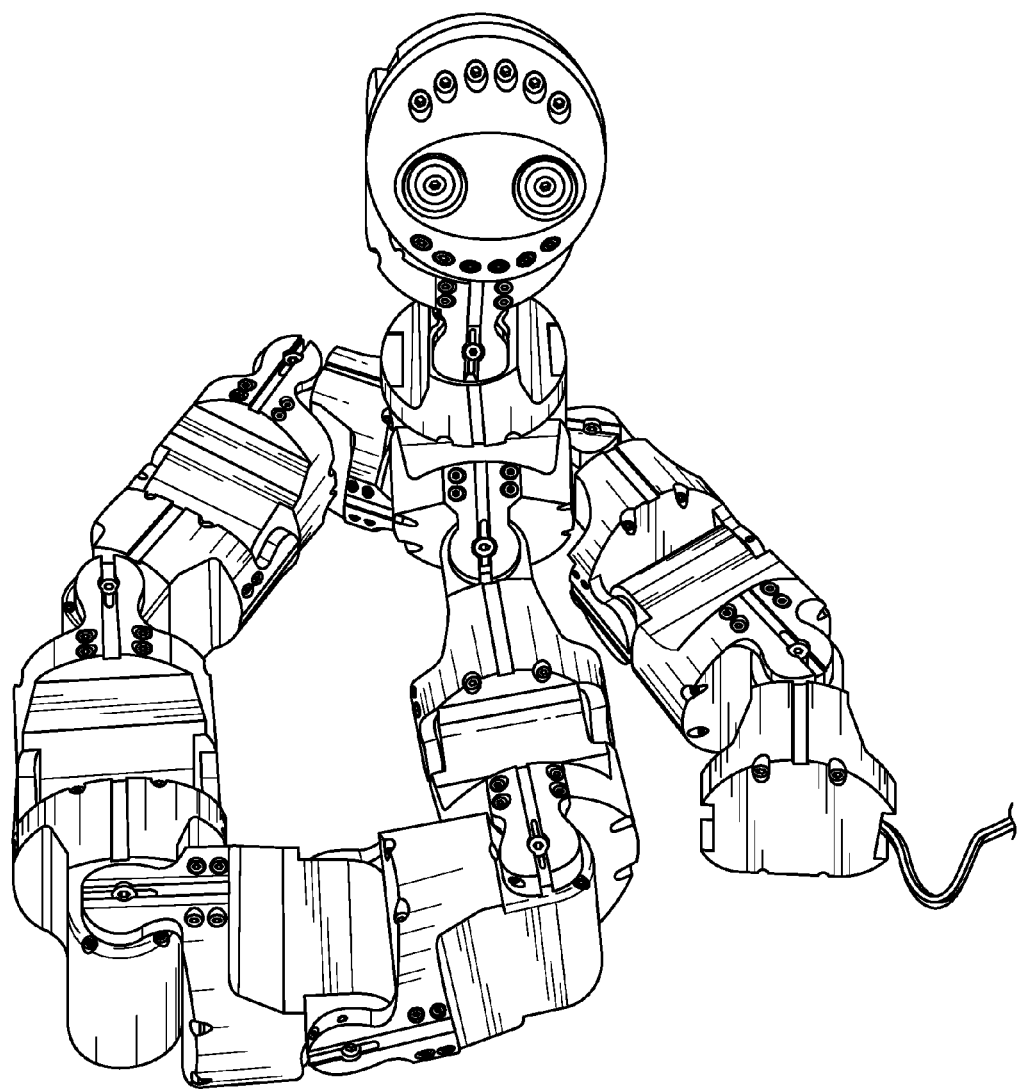
FIG. 6 is a photo of a snake robot to which two-far end supported actuator modules using an inner wire according to the present invention have been applied.

FIG. 1 is a perspective view of a two-far end supported actuator module for a snake robot using an inner wire according to the present invention. FIG. 2 is a frontal sectional view of a two-far end supported actuator module for a snake robot using an inner wire according to the present invention. FIG. 3 is a bottom view illustrating a lower cover of a two-far end supported actuator module for a snake robot using an inner wire according to the present invention. FIG. 4 is a planar sectional view illustrating a coupled state among a plurality of two-far end supported actuator modules for a snake robot using an inner wire according to the present invention. FIG. 5 is a side sectional view illustrating an example of an attached state of a rubber pad of two-far end supported actuator modules for a snake robot using an inner wire according to the present invention. FIG. 6 is a photo of a snake robot to which two-far end supported actuator modules for a snake robot using an inner wire according to the present invention have been applied.

As shown in FIGS. 1 to 4, the far-end supported actuator module for a snake robot using an inner wire according to the present invention includes a module housing 1, an upper cover 2, a lower cover 2, a first connection bracket 3, and a second connection bracket 4.

Preferably, the module housing 1 is formed of a metallic material. A driving means 11 and a reducer 12 are mounted in the module housing 1, and a plurality of accommodation portions 13 are formed on an outer surface of the module housing 1.

The accommodation portions 13 are formed on a front surface and a rear surface of the module housing 1. The accommodation portion 13 formed on the front surface of the module housing 1 is provided with a wire discharging hole (not shown) through which a wire connected to various types of components mounted in the module housing 1 is drawn out.

A plurality of tap holes (not shown) for coupling bolts are formed at the accommodation portions 13 of the module housing 1.

As the driving means 11, a servo motor, a DC motor, etc. are used. A controller 8 and a gear portion 9, configured to control an operation of the driving module, are mounted at an inner upper part of the module housing 1.

As shown in FIG. 5, a rubber pad 7 may be attached to at least one of surfaces of the module housing 1, the upper cover 2 and the lower cover 2, for prevention of damage of the surface due to friction with the floor.

The upper cover 2 and the lower cover 2 are detachably installed at an upper part and a lower part of the module housing 1, respectively. A rotation shaft passing hole (not shown) for passing a rotation shaft 14 therethrough is formed at the upper cover 2 of the module housing 1. A wire passing hole 21 for passing a wire 5 therethrough is formed at the lower cover 2 of the module housing 1.

Preferably, the covers 2 are formed of a metallic material like the module housing 1. A groove 6a is formed at each cover 2, and a plurality of through holes 25 for passing bolts therethrough are formed at two sides of the groove 6a.

The cover 2 includes a protrusion portion 22 having a semi-circular shape in a planar view; a rotation portion 23 outward extending from the protrusion portion 22 with an inclination angle, and guiding the driving module to freely-rotate with an angle of 90° right and left; and a rolling portion 24 having a curved shape in a side view, extending from the end of the rotation portion 23, and guiding the driving module to roll freely.

In a case where a plurality of driving modules are connected to one another to operate under the configuration of the protrusion portion 22 and the rotation portion 23, the covers 2 can rotate up to 90° right and left. A plurality of coupling holes 221 for coupling bolts in a coupled state to the covers 2 are formed on an inner side surface of the protrusion portion 22.

As the upper cover 2 and the lower cover 2 are coupled to an upper part and a lower part of the module housing 1, respectively, one side surface of the driving module has a circular shape. A bearing 211 is forcibly-inserted into the wire passing hole 21 of the lower cover 2, so that a rotational friction of an insertion portion 321 inserted into the wire passing hole 21 can be reduced.

Grooves 6a are formed at intermediate parts of surfaces of the upper cover 2 and the lower cover 2, and grooves 6b are formed at intermediate parts of surfaces of the first connection bracket 3 and the second connection bracket 4. As a result, the module housing 1 and the upper cover 2 (or lower cover 2) disposed on the floor can be supported in a balanced state. The first connection bracket 3 is formed of a metallic material or a synthetic resin material. One side of the first connection bracket 3 is coupled to one accommodation portion 13 of the module housing 1, and another side of the first connection bracket 3 is coupled to a lower cover of another driving module. Under such configuration, the first connection bracket 3 guides the wire 5 thereinto.

The first connection bracket 3 includes a first fixing portion 31 inserted into the accommodation portion 13 of the module housing 1, formed to have the same thickness as a depth of the accommodation portion 13, and having a plurality of coupling holes 311 for coupling bolts; a first connection portion 32 extending from the first fixing portion 31, and having an inner side surface from which the insertion portion 321 to be inserted into the wire passing hole 21 protrudes; and a wire inducing accommodation portion 33 formed on an inner side surface of the first fixing portion 31 and the first connection portion 32 in a lengthwise direction, and inducing the wire 5 to pass through inside of the first connection bracket 3 without being exposed to outside. The wire inducing accommodation portion 33 is formed so as to be communicated with inside of the insertion portion 321.

The second connection bracket 4 is coupled to another accommodation portion of the module housing 1 on the opposite side of the first connection bracket 3, and the rotation shaft 14 is inserted into one side of the second connection bracket 4 to thus be supported.

The second connection bracket 4 includes a second fixing portion 41 inserted into the accommodation portion 13 of the module housing 1, formed to have the same thickness as a depth of the accommodation portion 13, and having a plurality of coupling holes 411 for coupling bolts; and a second connection portion 42 extending from the second fixing portion 41, and having a through hole 421 for inserting the rotation shaft 14 thereinto.

One side of the first connection bracket 3 is coupled to the accommodation portion 13 of the module housing 1, and another side of the first connection bracket 3 is coupled to the bearing 211 forcibly-inserted into the wire passing hole 21 formed at a lower cover of another driving module.

One side of the second connection bracket 4 is coupled to the accommodation portion 13 of the module housing 1, and another side of the second connection bracket 4 is coupled to the rotation shaft 14 penetratingly-formed at an upper cover of said another driving module.

As the first connection bracket 3 and the second connection bracket 4 are formed in the same thickness as the depth of the accommodation portion 13, the first connection bracket 3 and the second connection bracket 4 are not protruded to outside. Accordingly, the driving module can have a small size and a simplified configuration, and can be prevented from being locked to an obstacle when operated.

As shown in FIG. 6, a snake robot, to which the two-far end supported actuator modules using an inner wire according to the present invention have been coupled, is driven independently according to each driving module.

Even under a configuration that a plurality of two-far end supported actuator modules for a snake robot using an inner wire according to the present invention are coupled to one another, the wire 5 is installed to pass through inside of the driving modules without being exposed to outside. As a result, the conventional problems, such as disconnection or twist of the wire 5 occurring when the driving module operates, can be solved.

Further, as the accommodation portions 13 of the module housing 1 are formed at two sides of the module housing 1, the first connection bracket 3 and the second connection bracket 4 can be switched from each other. Accordingly, the gear portion 9 mounted at an upper part of the module housing 1 can be arranged at a lower part of the snake robot, so that the center of gravity of the snake robot can be toward the lower side.

The present invention can have the following advantages.

As aforementioned, as the conventional connection member which protrudes toward outside is not additionally installed, the snake robot can have a small size and a simplified configuration. As a result, the snake robot can have a snake shape. Further, as interference between the connection bracket and external environments is minimized, increase of the entire weight and volume of the snake robot can be prevented.

Further, the driving modules are connected to one another in a two-far end supported form, the connection is stable. Besides, the wire for connecting the plurality of driving modules one another is installed to pass through inside of the driving modules. Accordingly, the conventional problems, such as disconnection or twist of the wire occurring when the driving modules operate, can be solved, and thus the driving modules can operate without restrictions.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A two-far end supported first actuator module for a snake robot using an inner wire, comprising:
    a first driving module housing having a driving means and a reducer mounted therein, and having a plurality of accommodation portions on an outer surface thereof;
    an upper cover and a lower cover detachably installed at an upper part and a lower part of the module housing, respectively, wherein the upper cover has a rotation shaft passing hole for passing a rotation shaft therethrough, and the lower cover has a wire passing hole for passing a wire therethrough;
    a first connection bracket having a first side coupled to a first accommodation portion of the module housing, and a second side coupled to a lower cover of a second driving module, and configured to guide the wire thereinto; and
    a second connection bracket having a first side coupled to a second accommodation portion of the module housing on the opposite side of the module housing from the first connection bracket rotating together with the first connection bracket on the basis of a rotation shaft, and having a second side to which the rotation shaft protruding through an upper cover of a second actuator module is inserted to be supported;
    the second actuator module adjacent to the first actuator module and having the same shape as the first actuator module, wherein the second connection bracket includes:
    a second fixing portion inserted into the accommodation portion of the module housing, formed to have the same thickness as a depth of the accommodation portion, and having a plurality of coupling holes for coupling bolts; and
    a second connection portion extending from the second fixing portion, and having a through hole for inserting the rotation shaft of said another driving module thereinto.

2. The two-far end supported actuator module for a snake robot using an inner wire of claim 1, wherein each cover includes:
    a protrusion portion having a semi-circular shape in a planar view;
    a rotation portion outward extending from the protrusion portion with an inclination angle, and guiding the driving module to rotate with an angle of 90° right and left; and
    a rolling portion having a curved shape in a side view, extending from the end of the rotation portion, and guiding the driving module to roll freely.

3. The two-far end supported actuator module for a snake robot using an inner wire of claim 1, wherein a bearing is inserted into the wire passing hole of the lower cover.

4. The two-far end supported actuator module for a snake robot using an inner wire of claim 1, wherein a groove is formed at an intermediate part on a surface of each of the upper cover, the lower cover, the first connection bracket and the second connection bracket, in a lengthwise direction.

5. The two-far end supported actuator module for a snake robot using an inner wire of claim 1, wherein a rubber pad is attached to at least one of surfaces of the module housing, the upper cover and the lower cover, for prevention of damage of the surface due to friction with the floor, and for attenuation of an impact.

6. The two-far end supported actuator module for a snake robot using an inner wire of claim 1, wherein the first connection bracket includes:
    a first fixing portion inserted into the accommodation portion of the module housing, formed to have the same thickness as a depth of the accommodation portion, and having a plurality of coupling holes for coupling bolts;
    a first connection portion extending from the first fixing portion, and having an inner side surface from which an insertion portion protrudes, the insertion portion to be inserted into the wire passing hole of the lower cover of said another driving module,
    a wire inducing accommodation portion formed on an inner side surface of the first fixing portion and the first connection portion in a lengthwise direction, and inducing the wire to pass through inside of the first connection bracket without being exposed to outside.

* * * * *